United States Patent Office 3,226,343
Patented Dec. 28, 1965

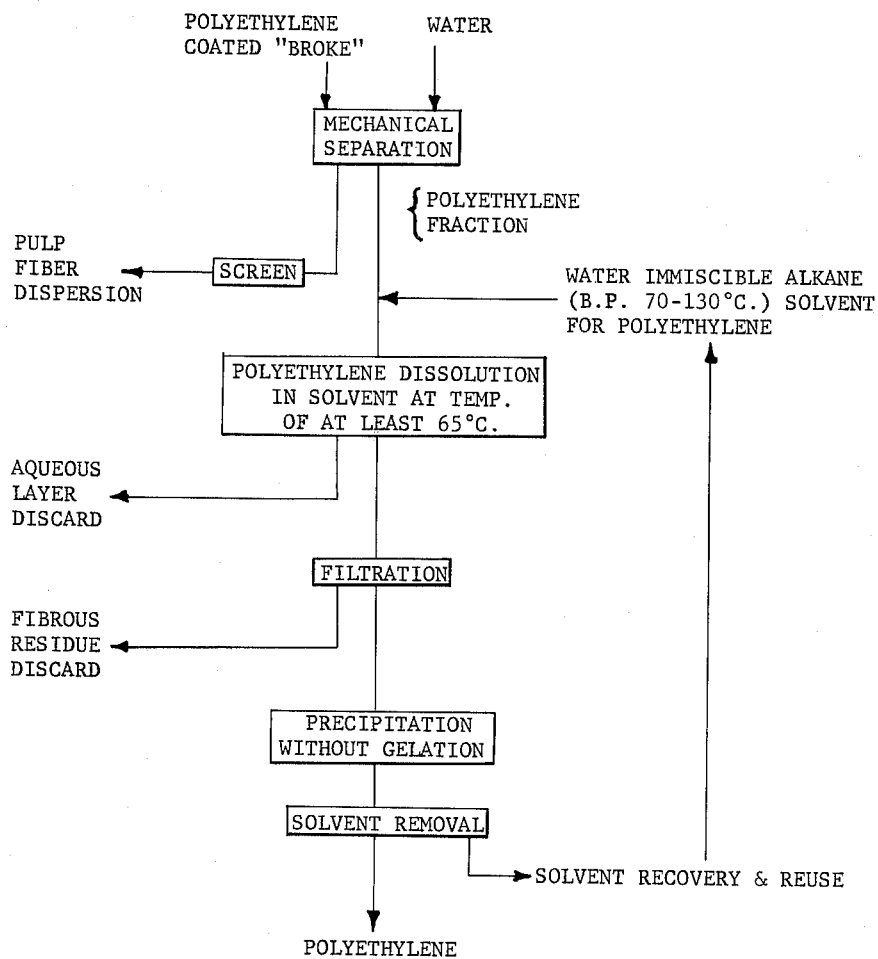

3,226,343
PROCESS OF RECOVERY OF POLYETHYLENE
FROM CELLULOSIC FIBERS
Philip H. Rhodes, Cincinnati, Ohio, assignor to Champion Papers Inc., Hamilton, Ohio, a corporation of Ohio
Filed Apr. 26, 1962, Ser. No. 190,351
11 Claims. (Cl. 260—2.3)

This invention relates to the recovery of the constituents of waste or scrap plastic coated fibrous cellulosic webs of paper and the like. More particularly it relates to the recovery of polyethylene in useful powder form from waste polyethylene coated fibrous cellulosic webs.

The recent trend to polyethylene coated paper, particularly board, for purposes of milk packaging and the like has created for both paper manufacturer and converter a serious waste recovery and reusal problem. Although various mechanical means based upon repulping in aqueous medium have been achieved for satisfactorily reclaiming the fibrous portion of the waste and scrap material, or "broke" as it is commonly referred to in the industry, the more expensive polyethylene portion, which constitutes a substantial fraction of the broke, remains excessively contaminated such that it is totally unsuitable for nearly all purposes. The efficient recovery of the polyethylene coating in useful form in addition to the fibrous cellulosic fraction is of considerable importance for reasons of economics.

In accordance with this invention, a method is provided for the recovery of polyethylene from a water-wet mixture of water-insoluble materials containing a substantial proportion of polyethylene with a significant quantity of cellulosic pulp fibers. In one embodiment, the moist mixture is the fiber contaminated polyethylene residue from the repulping of polyethylene coated paper broke in aqueous medium. The moist mixture is blended with a polyethylene solvent which has a boiling point in the range of 70° to 130° C., is water-immiscible and contains predominately alkanes, a major weight proportion of which are $C_7$ to $C_8$. Desirably the weight ratio of the polyethylene in the mixture to the solvent is at least about 3.0:100, and preferably in the range of 3.5:100 to 15:100. Thereafter the blend is subjected to a temperature of no less than about 65° C. to dissolve the polyethylene. Subsequently the solvent and polyethylene solute are separated from the fibers and aqueous phase and thereafter the polyethylene is recovered therefrom, desirably by precipitation upon cooling.

Although the art is replete with suggestions for recovering the coating and fiber constituents of various types of coated paper broke, the operational considerations involved in attaining an efficient, commercially practical system are many. The polyethylene coatings, in particular, are troublesome owing to their poor solvency in many organic liquids and to the difficulties encountered in obtaining a precipitate which is readily separated. Many solvents which will dissolve sufficient polyethylene to permit a practical separation yield a non-filterable gel upon precipitation. Still other solvents are characterized by a pronounced tendency toward excessive foaming in the presence of water under elevated temperature conditions. Anti-foaming agents which might overcome this difficulty, excessively contaminate the product and prevent its usage for many purposes, particularly those requiring contact with food.

Often various solvents for polyethylene which would appear to be satisfactory for recovery techniques prove to be unsuitable for still other reasons. Thus certain materials such as the petroleum distillate fractions and the petroleum ethers tend to leave an odorous, higher boiling "tail" which is difficult to remove from the polyethylene precipitate. The fact that such solvents can have relatively high boiling points, often over wide boiling ranges, further complicates an efficient recovery of the solvent. Still other solvents are unsuitable owing to their toxicity, reactivity, or excessive cost.

The process of this invention is particularly advantageous in overcoming the foregoing objections. Thus the alkane solvents employed permit an efficient recovery of polyethylene in a purified form while minimizing the effect of problems such as toxicity of solvents, foaming tendency in the presence of water, and solvent contamination of the polyethylene material produced. Of particular significance, the process of the invention yields highly useful powder precipitates of polyethylene which heretofore have normally been produced by expensive mechanical powdering techniques. Among the numerous operational advantages of the process, the precipitate is produced in a form which is readily filterable; this being in contrast to a variety of other solvents which give an undesirable gel upon cooling. As a further advantage, the solvents employed are readily recoverable at moderate temperatures for purification and recycling.

Although numerous advantages are indicated above for the process of this invention, the list is not exhaustive and still other advantages will be apparent from the description hereinafter.

The sequence of steps involved in the recovery of polyethylene from broke material is outlined as a flow sheet in the drawing.

One typical step for effectively removing the fibrous cellulosic portion of polyethylene coated broke by mechanical separation is described in detail by Felton, Modern Converter, pp. 13–14, August 5, 1961. This is based upon repulping of the broke with a high shearing force in aqueous medium at a low consistency. After complete dispersion of the cellulose, the consistency is further reduced, the bulk of the water and fibers withdrawn, so that the moist polyethylene material, in the form of large size flakes contaminated with fibers, remains as a residue. Further cleaning, e.g. by screening, of the fiber dispersion is ordinarily performed prior to its reuse in the paper machine.

Any direct reuse of the separated polyethylene material produced by the foregoing is complicated not only by its fiber contamination but also by the fact that its residual moisture content is appreciable. Any drying must be performed at comparatively low temperatures to avoid softening of the polymer. Even though dried, however, a small percentage of fibers in the polyethylene material will make it wholly unsuitable for most purposes, especially where moisture barrier characteristics are essential or where melting is necessary.

Depending upon the efficiency of the repulping and screening phases of the mechanical separation step, the resultant water wet mixture of polyethylene and fibers can vary widely as to composition. For a practical recovery, the mixture on a dry basis should ordinarily contain a major weight proportion of polyethylene, usually 55 to 99.9%, and a minor weight proportion of residual cellulosic pulp fibers, usually 0.1 to 45%. Such a mixture, separated from the aqueous pulp fibers dispersion without further reduction in water content, is ordinarily accompanied by at least 5% and usually 10 to 100% water, basis dry mixture. Even such a high proportion of water gives no difficulty in the subsequent treatment with polyethylene solvent and recovery therefrom according to the invention. Since the residual water is immiscible with the solvent and since the aqueous phase which results is readily separated following dissolution of the polyethylene, the water-wet mixture need not be heated or otherwise dried to further reduce its moisture content. A simple pressing operation is entirely satisfactory in removing the large bulk of water which may remain with the mixture.

Of particular significance, the presence of appreciable quantities of residual water with the mixture, in addition to simplifying the overall procedure, permits the separation of pulp impurities and polyethylene additives which otherwise would be concentrated in the solvent or which would be precipitated with the polymer to give undesirable contamination.

The initial removal of the bulk of the pulp fibers in the above manner avoids the adverse effects upon the cellulose which would be encountered if solvent extraction were performed on the entire broke material.

Following the mechanical separation step, the water wet, fiber contaminated polyethylene material is treated with a solvent for the polyethylene.

The considerations involved in the selection of a suitable solvent for recovering polyethylene in a purified and useful form from the moist fiber contaminated material are many. Thus the solvent must be inexpensive, inert, non-viscous, a non-solvent for the fibers, preferably non-toxic and non-corrosive, and readily dissolve the polymer at elevated temperatures but permit it to be precipitated at lower temperatures, i.e., upon cooling. Since moisture is present, the solvent must be water-immiscible and not cause undue foaming. Of perhaps greatest significance, the solvent must be capable of yielding a readily filterable precipitate, i.e., a powder rather than a gel. For efficient solvent recovery by common distillation techniques, its boiling point should not be unduly high or extend over a relatively wide range.

It has been found that the foregoing considerations are fully attained by solvents which have a boiling point in the range of 70° C. to 130° C. and which are predominately composed of alkanes, at least a major weight proportion having seven to eight carbon atoms ($C_7$ to $C_8$). In a preferred embodiment, the solvents should have a boiling point in the range of 80° to 110° C. for greatest ease of solution and for reduced tendencies toward foaming. A particularly optimum boiling point range, however, is that which is at or slightly below the boiling point of water, i.e. 90° to 100° C., since this permits refluxing conditions for maximum dissolution of the polyethylene without interference from the moisture which is present. The solvent n-heptane having a boiling point of about 98.5° C. and being readily available in purified forms, especially exemplifies this class. Other suitable solvents with a boiling point in the range of 90 to 100° C. are 2-methyl hexane (B.P. 90.1° C.), 3-ethyl pentane (B.P. 93.3° C.), 2,2,4-trimethyl pentane or "isooctane" (B.P. 99.2° C.). Examples of those having a boiling point slightly outside that range and hence being somewhat less satisfactory are 2,2 dimethyl pentane (B.P. 79.3° C.), 3,3 dimethyl pentane (B.P. 86.1° C.), 2,5 dimethyl hexane (B.P. 109.3° C.) and n-octane (B.P. 125.6° C.). Commercially available mixed isomers of the foregoing alkanes, particularly the heptanes, which have a relatively narrow boiling point range, i.e. a few degrees, are entirely satisfactory.

During the polyethylene dissolution step, the weight ratio of the polyethylene in the mixture of fiber contaminated material, dry basis, to the solvent should be at least about 3.0:100. Quantities of polyethylene below this amount make it difficult to economically recover the polyethylene. For the higher ratios i.e. above 10:100, pressures in excess of atmospheric pressure may be required. Desirably the ratio of the polyethylene in the fiber contaminated material to solvent is in the range of 3.5:100 to 15:100. While higher proportions of polyethylene would seemingly provide a greater recovery rate, in practice it has been found that the viscosity becomes too high to permit practical filtration.

The mixture of polyethylene, cellulosic fibers, water and solvent is then heated to at least 65° C., preferably to at least 80° C., to dissolve the polyethylene. Desirably such heating is conducted with agitation at the refluxing temperature of the mixture to minimize the time required to effect complete solution of the polymer. Particularly where the boiling point of the solvent is relatively low, pressures above atmospheric pressure can effectively be used.

Following complete dissolution of the polyethylene in the solvent, the mixture of aqueous and non-aqueous phases is ready for filtration of the undissolved material, this being predominately composed of cellulosic fibers along with dirt specks and the like. Either immediately before or after the filtration, the heavier aqueous phase is separated, e.g. by gravity through a valve and conduit provided in the dissolution or receiving vessel.

Before seperation of the polyethylene from the solvent in which it is dissolved, it is entirely practical to add various modifying agents, for example, dyes, pigments, antioxidants, extenders and the like. For the production of colored polyethylene powders, the addition of dyes and pigments is readily accomplished and the product is highly suitable for the various well known molding and extrusion processes.

Following the separtion of the aqueous phase and the removal of the fiber contamination, the polyethylene solution can be subjected to treatment for recovery of the polymer content. Cooling of the solution either by the removal of heat or by the addition of cold solvent yields a powdery precipitate which is readily filterable from the liquor. As mentioned previously, the particular alkane solvents employed in accordance with this invention produce a filterable powder in contrast to a variety of other solvents which yield a difficultly filterable gel. As a result, the powder can easily be freed of nearly all residual traces of solvent.

The purified polyethylene material recovered in accordance with the foregoing can be employed in the various applications in which polyethylene is commonly used. Since it can be obtained in a powdered form, it is particularly useful for purposes which heretofore have required mechanical disintegration or powdering techniques. No evidence has ben found that polymer degradation occurs during the recovery process.

The initial polyethylene coated broke to be utilized in accordance with this invention can vary considerably as to composition. The type from stocks in which the surface of the polyethylene has been printed or otherwise treated with various surface coatings, i.e. to impart ink receptivity, are readily treated by the process of this invention. The polyethylene portion is desirably of the low or moderate density variety, e.g. those materials having a density of 0.91 to 0.935. Such materials are prepared by the high pressure process to yield non-linear polymeric structures. The cellulosic portion or substrate of the broke can be formed of bleached, partially bleached or unbleached stocks including mixtures of these. In most cases with polyethylene coated cellulosic webs, including paper and paperboard, the polyethylene coating will constitute on a dry weight basis approximately 5 to 30% of the material. It is to be understood that the phrase cellulosic web embraces those non-woven fibrous materials which are wholly cellulosic or which are composed of mixtures of cellulosic and non-cellulosic fibers. At various stages of the process it is entirely practical to add fiber-free scrap or waste polyethylene, e.g. film, to the broke to simultaneously recover the polyethylene in useful form therefrom.

The invention will be further described in the following examples wherein all parts are by weight unless otherwise stated.

EXAMPLES (A) Water-wet, fiber contaminated polyethylene material was produced in accordance with the method described by Felton, Modern Converter, pp. 13–14, August 5, 1961. The polyethylene broke starting material consisted of mixed semi-bleached, fibrous cellulosic sulfate board of 0.017 to 0.022 inch thickness provided on one side with a 1.5-mil thick coating of polyethylene and on the other side with a 0.75-mil thick coating of polyethylene. The polyethylene coating had a density of 0.93, a melt index of 3.0 and constituted about 13%, dry basis, of the broke.

The broke, cut into portions of a few square inches each, was repulped in water at a broke concentration of 4 to 8%, diluted to a final concentration of about 1%, and the pulp dispersion finally removed to yield a residue containing about 25% water in which the solids content consisted of 75% polyethylene and 25% cellulosic fiber.

For laboratory purposes, the repulping and polyethylene separtion was essentially duplicated using a vessel provided with a high speed mixer followed by screening with a simple flat bed screen to separate the bulk of the fiber contaminated polyethylene.

(B) In a stainless steel vessel there was added approximately 6.7 parts, dry basis, of the fiber contaminated polyethylene, containing about 2.3 parts of water, with 100 parts of commercial n-heptane having a boiling point in the range of 96–98° C.

The mixture was heated under atmospheric pressure to reflux, about 94° C., until the polyethylene had completely dissolved. The bulk of the fiber and dirt separated with the heavier aqueous phase and this drawn off through a conduit provided near the bottom of the vessel. The residual solution of polyethylene in the n-heptane was filtered hot through a 10-micron cotton fiber filter to yield a solution free of suspended material.

For precipitation, cold n-heptane, temperature 20° C., was added to the polyethylene solution in the volume ratio of 1:6, about 15% by volume of cold solvent, the powdery precipitate being then easily filtered by vacuum filtration and dried to remove residual traces of solvent.

The filtrate of solvent obtained was entirely suitable for recycling and reuse in the treatment of subsequent batches of moist fiber contaminated polyethylene. In some instances it was desirable to purify the recovered solvent by evaporation and condensation.

Analysis of the recovered polyethylene indicated that no polymer degradation or decomposition had occurred during the process. The polyethylene was satisfactorily extruded into other useful forms, for example pellets and film.

(C) The procedure of B above was repeated but employing as the solvent commercial isooctane having a boiling point of 104–106° C. An easily filterable precipitate of polyethylene was formed and the solvent removed therefrom. Although a slight amount of foaming was observed upon refluxing in the presence of water, the recovery process otherwise proceeded satisfactorily.

(D) An attempt was made to reproduce the successful results of parts of B and C above, but employing various other solvents. In each case the results were unsatisfactory for the following reasons.

| Solvent and Boiling Point | Condition of Cooled Solution | Remarks |
|---|---|---|
| Perchloroethylene— 121–123° C. | Unfilterable gel | Polyethylene completely dissolved, also excessive foaming. |
| Toluene—100–111° C. | ___do___ | Polyethylene completely dissolved, also excessive foaming. |
| Petroleum ether— 35–60° C. | Filterable precipitate. | Very low in solvency (about 1%) |
| Cyclohexane—81° C. | ___do___ | Very low in solvency. |
| Carbon tetrachloride— 76° C. | Unfilterable gel | Little polyethylene dissolved. |
| Benzene—80° C. | Filterable precipitate. | Insufficient polyethylene dissolved. |
| Hexane—66–69° C. | ___do___ | Low solubility, less than 1%. |

Even aside from the severe difficulties mentioned above, numerous other disadvantages such as solvent toxicity, odorous residues and the like were also encountered.

Having described the invention, what is claimed is:

1. Method for recovery of polyethylene from a water wet mixture of water-insoluble materials containing a major weight proportion of polyethylene and a minor weight proportion of cellulosic pulp fibers, said weight proportions being on a dry basis, which comprises: blending said water wet mixture with a polyethylene solvent having a boiling point in the range of 70° to 130° C., the weight ratio of polyethylene in said mixture to the solvent being at least about 3.0:100, subjecting said blend to a temperature no less than about 65° C. to thereby dissolve the polyethylene, separating the solvent and polyethylene solute from the fibers, and thereafter recovering the polyethylene therefrom, the said solvent being water-immiscible and predominately alkanes, a major weight proportion of which are $C_7$ to $C_8$.

2. The method of claim 1 wherein said solvent has a boiling point in the range of 80 to 110° C.

3. The method of claim 1 wherein said solvent has a boiling point in the range of 90 to 100° C.

4. The method of claim 1 wherein said weight ratio of polyethylene in said mixture to the solvent is 3.5:100 to 15:100.

5. The method of claim 1 wherein the solvent and polyethylene solute separated from the fibers is cooled to precipitate said finely divided solute as a powder.

6. The method of claim 1 wherein said solvent is n-heptane.

7. The method of claim 1 wherein said solvent is a mixture of heptane isomers.

8. Method for recovery of polyethylene from a water wet mixture of water-insoluble materials containing a major weight proportion of polyethylene and a minor weight proportion of cellulosic pulp fibers, said weight proportions being on a dry basis, which comprises: blending said water wet mixture with a polyethylene solvent having a boiling point in the range of 90° to 100° C., the weight ratio of polyethylene in said mixture to the solvent being 3.5:100 to 15:100, subjecting said blend to refluxing conditions to thereby dissolve the polyethylene, separating the solvent and polyethylene solute from the blend and thereafter recovering the polyethylene therefrom by cooling to form a powder precipitate, the said solvent being water-immiscible and consisting essentially of alkanes, a major proportion of which are $C_7$ to $C_8$.

9. In a method for the separation of polyethylene and cellulosic fibers from mixtures thereof and wherein said mixture is mechanically agitated in the presence of water to yield a product which is subsequently separated to produce a moist polyethylene material of decreased fiber content, the improvement wherein: said moist polyethylene material is blended with a polyethylene solvent having a boiling point in the range of 70° to 130° C., the weight ratio of polyethylene in said material to the solvent being at least about 3.0:100, subjecting said blend to a temperature no less than about 65° C. to thereby dissolve the polyethylene, removing the aqueous phase, separating the solvent and polyethylene solute from the fibers, and thereafter recovering the polyethylene therefrom, the said solvent being water-immiscible and predominately alkanes, a major weight proportion of which are $C_7$ to $C_8$.

10. The method of claim 8 wherein said polyethylene solvent is n-heptane.

11. The method of claim 8 wherein said polyethylene solvent is a mixture of heptane isomers.

References Cited by the Examiner

UNITED STATES PATENTS

| | | | |
|---|---|---|---|
| 1,964,191 | 6/1934 | Branchen | 260—2.3 |
| 2,343,816 | 3/1944 | Sparks et al. | 260—2.3 |
| 2,742,440 | 4/1956 | Stott et al. | 260—2.3 |
| 3,043,785 | 7/1962 | Wright et al. | 260—2.3 |

OTHER REFERENCES

Synthetic Resins and Allied Plastics (3rd Edition), by various authors, TP 9 78 M65 (1951 C. 3), page 202.

LEON J. BERCOVITZ, *Primary Examiner.*

DONALD E. CZAJA, MURRAY TILLMAN,
*Examiners.*